United States Patent
Ledet

(10) Patent No.: US 10,547,707 B1
(45) Date of Patent: *Jan. 28, 2020

(54) INFORMATION MANAGEMENT AND CUSTOMIZATION BASED ON USER INTERESTS AND PREVIOUS TRANSACTIONS

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,964

(22) Filed: Feb. 19, 2019

Related U.S. Application Data

(63) Continuation of application No. 14/813,636, filed on Jul. 30, 2015, now Pat. No. 10,212,249.

(51) Int. Cl.
  *G06F 15/16* (2006.01)
  *H04L 29/08* (2006.01)

(52) U.S. Cl.
  CPC ............ *H04L 67/303* (2013.01); *H04L 67/32* (2013.01)

(58) Field of Classification Search
  CPC ............................ H04L 67/303; H04L 67/32
  USPC .................................................. 709/217, 223
  See application file for complete search history.

(56) References Cited

U.S. PATENT DOCUMENTS

| | | | |
|---|---|---|---|
| 9,117,178 B1 | 8/2015 | Chiu et al. | |
| 10,212,249 B1 * | 2/2019 | Ledet | H04L 67/303 |
| 2008/0301186 A1 | 12/2008 | Svendsen | |
| 2011/0213676 A1 | 9/2011 | Singh et al. | |
| 2013/0024273 A1 | 1/2013 | Stark et al. | |
| 2013/0073584 A1 | 3/2013 | Kuper et al. | |
| 2013/0298175 A1 | 11/2013 | Agrawal et al. | |
| 2015/0095183 A1 | 4/2015 | Desmond et al. | |
| 2015/0095248 A1 | 4/2015 | Wong et al. | |
| 2015/0149629 A1 | 5/2015 | Zhang et al. | |
| 2016/0275194 A1 | 9/2016 | Borza et al. | |
| 2016/0342705 A1 | 11/2016 | Zheng | |

* cited by examiner

*Primary Examiner* — Philip B Tran

(57) ABSTRACT

Identifying user input data on a mobile user device may provide a way to predict the types of questions and actions a user will take and offer information contemporaneously with such actions. One example method of operation includes identifying an active application programming interface (API) of a presently operating application executing on the user device, and identifying input data populating the application. Then, storing and processing the input data to identify a topic of interest and retrieving relevant content that is associated with the topic of interest, and creating a recommendation message based on the relevant content.

20 Claims, 17 Drawing Sheets

600

610

620

630

| | Weighted Remote |
|---|---|
| Information clicked | 10 |
| Information served | 5 |
| Requested Searches | 10 |
| Groups Joined/Created | 12 |
| Emails | 15 |
| Calendar Events | 15 |
| Surfing | 10 |
| Location | 11 |
| Games | 6 |
| Video | 8 |
| GPS | 12 |

640

| Symbol | Function |
|---|---|
| A | Information clicked |
| B | Information served |
| C | Requested Searches |
| D | Groups Joined/Created |
| E | Emails |
| F | Calendar Events |
| G | Surfing History |
| H | Location |
| I | Games |
| J | Video |
| K | GPS |

FIG. 6E

| Equation | Description |
|---|---|
| $K_l 3 + [A,B,C,D,E,F,G,H,I,J]$ | GPS local times 3 + other data |
| $G_l 2 + [A,B,C,D,E,F,G,H,I,J]$ | Surfing History local times 2 + other data |
| $(F_r + D_r)2 + [A,B,C,E,G,H,I,J,K]$ | Remote Groups and Calendars x 2 + other data |
| If $\{[A,B,C,D,E,F,G,H,I,J,K]_{timestamp} <= 5\ days\}$ then $[A,B,C,D,E,F,G,H,I,J,K]2$ | Data x 2 if timestamp is recent |
| $G_l 2 + [A,B,C,D,E,F,G,H,I,J]$ | Surfing history local x 2 + other data |
| $(A + K)2 + (A + E)$ | Information Clicked + GPS >> Information Clicked + Email |

FIG. 6F

INFORMATION MANAGEMENT AND CUSTOMIZATION BASED ON USER INTERESTS AND PREVIOUS TRANSACTIONS

TECHNICAL FIELD OF THE APPLICATION

This application relates to information management and customization and more particularly to incorporating user's interests and transactions to prepare future information processing operations.

BACKGROUND OF THE APPLICATION

Software defined networking (SDN) is an approach to computer networking that permits network administrators to manage network services through the abstraction of lower level functionality. For example, this abstraction is accomplished by decoupling the functionality that would normally make decisions about where traffic is sent (i.e., the control plane) from the underlying layers that forward traffic to the selected destination (i.e., the data plane).

In one example, when a packet arrives at a conventional networking switch, predefined rules instruct the switch where to forward the packet. In general, every packet may be sent to the same destination and along the same path thus treating all similar packets in the same manner. However, the goal of SDN is to enable network engineers and administrators with the ability to shape traffic from a centralized control console without having to interact with the individual switches. The shaping of traffic includes prioritizing, de-prioritizing and blocking specific types of packets at a granular level of control.

SDN implementations are emerging architectures that offer dynamic, manageable, cost-effective, and adaptable approaches for the high-bandwidth, dynamic nature of today's applications. SDN architectures decouple network control and forwarding functions, enabling network control to become directly programmable and the underlying infrastructure to be abstracted from applications and network services.

SUMMARY OF THE APPLICATION

One example embodiment may provide a method that includes at least one of identifying an active application programming interface (API) of a presently operating application executing on a user device, identifying input data populating at least one portion of the presently operating application, storing and processing the input data to identify a first topic of interest at an application server, retrieving relevant content that is associated with the first topic of interest, and creating a recommendation message based on the relevant content.

Another example embodiment may include an apparatus that includes a processor configured to perform at least one of identify an active application programming interface (API) of a presently operating application, identify input data populating at least one portion of the presently operating application, process the input data to identify a first topic of interest, and a memory configured to store the input data, and the processor is further configured to retrieve relevant content that is associated with the first topic of interest, and create a recommendation message based on the relevant content.

Yet another example embodiment includes a non-transitory computer readable storage medium configured to store instructions that when executed causes a processor to perform at least one of identifying an active application programming interface (API) of a presently operating application executing on a user device, identifying input data populating at least one portion of the presently operating application, storing and processing the input data to identify a first topic of interest at an application server, retrieving relevant content that is associated with the first topic of interest, and creating a recommendation message based on the relevant content.

Yet still another example embodiment may include a method configured to perform at least one of identifying an active application programming interface (API) of a presently operating application executing on a user device, identifying input data populating at least one portion of the presently operating application via an application server, retrieving at least one user characteristic, processing the input data based on the at least one user characteristic and creating a customized suggestion message that utilizes the at least one user characteristic to provide customized content in the customized suggestion message, and transmitting the customized suggestion message to the user device.

Yet still a further example embodiment may include an apparatus with a processor configured to perform at least one of identify an active application programming interface (API) of a presently operating application executing on a user device, identify input data populating at least one portion of the presently operating application via an application server, retrieve at least one user characteristic, process the input data based on the at least one user characteristic and create a customized suggestion message that utilizes the at least one user characteristic to provide customized content in the customized suggestion message, and a transmitter configured to transmit the customized suggestion message to the user device.

Still yet another example embodiment may include a non-transitory computer readable storage medium configured to store instructions that when executed causes a processor to perform at least one of identifying an active application programming interface (API) of a presently operating application executing on a user device, identifying input data populating at least one portion of the presently operating application via an application server, retrieving at least one user characteristic, processing the input data based on the at least one user characteristic and creating a customized suggestion message that utilizes the at least one user characteristic to provide customized content in the customized suggestion message, and transmitting the customized suggestion message to the user device.

BRIEF DESCRIPTION OF THE DRAWINGS

FIG. 6E illustrates an example table of symbols and function pairings according to an example embodiment of the present application.

FIG. 6F illustrates an example table of weighted functions and expression details according to an example embodiment of the present application.

DETAILED DESCRIPTION OF THE APPLICATION

Figure 1:
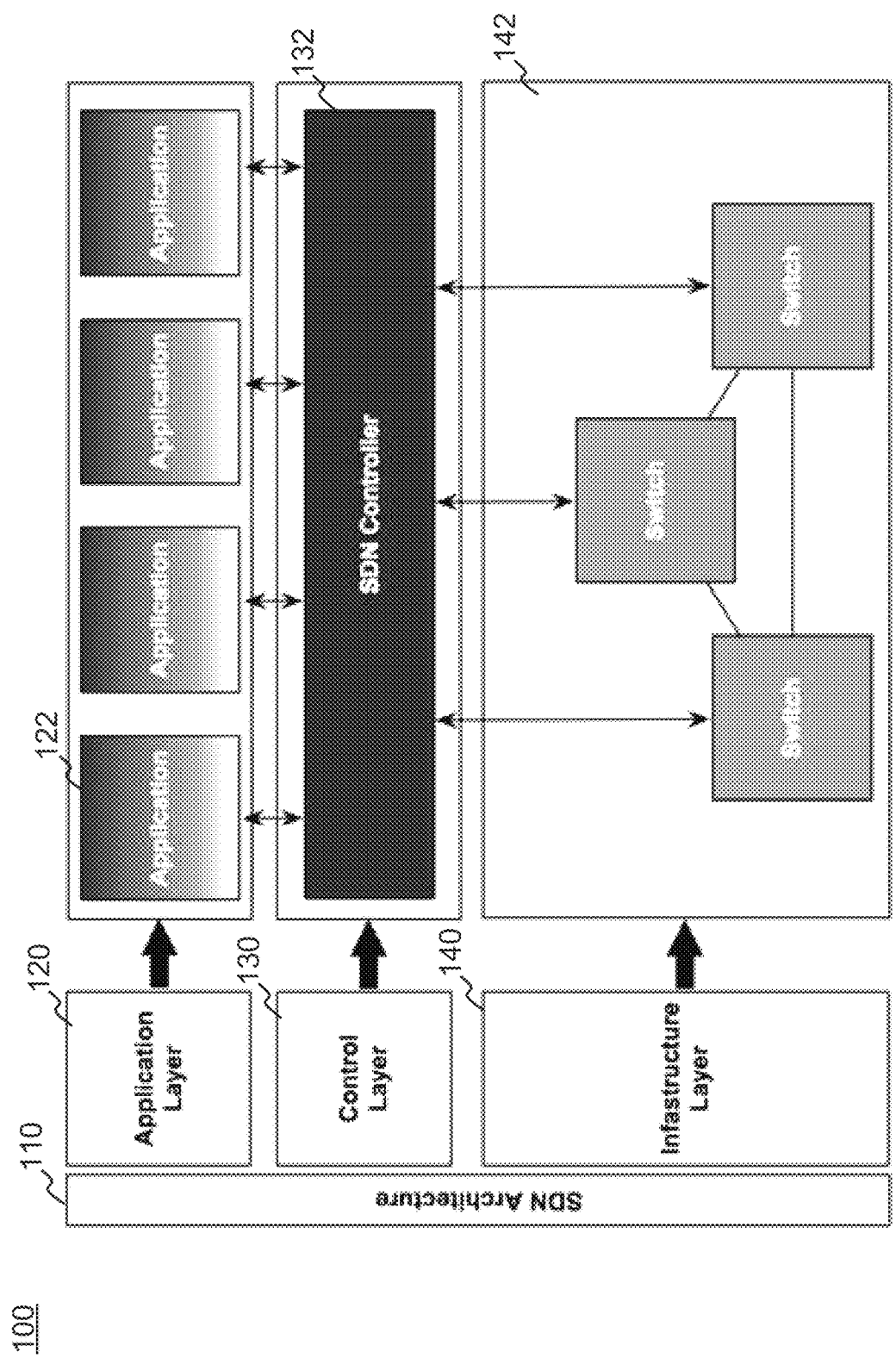
FIG. 1 illustrates a SDN system architecture diagram according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments of the present application provide an application that utilizes user's characteristics and/or interests in order to provide requested and unrequested input. The application parses the messages identified both incoming and outgoing from the user's device and can interact with other entities to obtain information that enhances the known information in the messages identified to provide alternate, additional, or less information to the user. For example, the messages may have a foundational set of characteristics, such as data content, origination address, destination address, etc. However within the core content of the message may be data types, data formats, requests, commands, etc. which could lead the application processing modules to extract additional message characteristics for enhanced processing functions. The application may examine the message and obtain an understanding of the user's characteristics and interests, and examples provide a granular approach to the functionalities of the application.

The foundational block diagram of FIG. 1 provides a basic SDN architecture configured to perform network traffic manipulation according to example embodiments. Referring to FIG. 1, the diagram 100 includes a main SDN architecture 110 with three sub-components or modules including the application layer 120, the control layer 130 and the infrastructure layer 140. The application layer 120 may process various different applications 122 which are linked to the SDN controller 132. The data input and output of each of the applications 122 corresponds to a number of switches 142 configured to receive the message forwarding and receiving operations commanded by the SDN controller 132.

Figure 2:
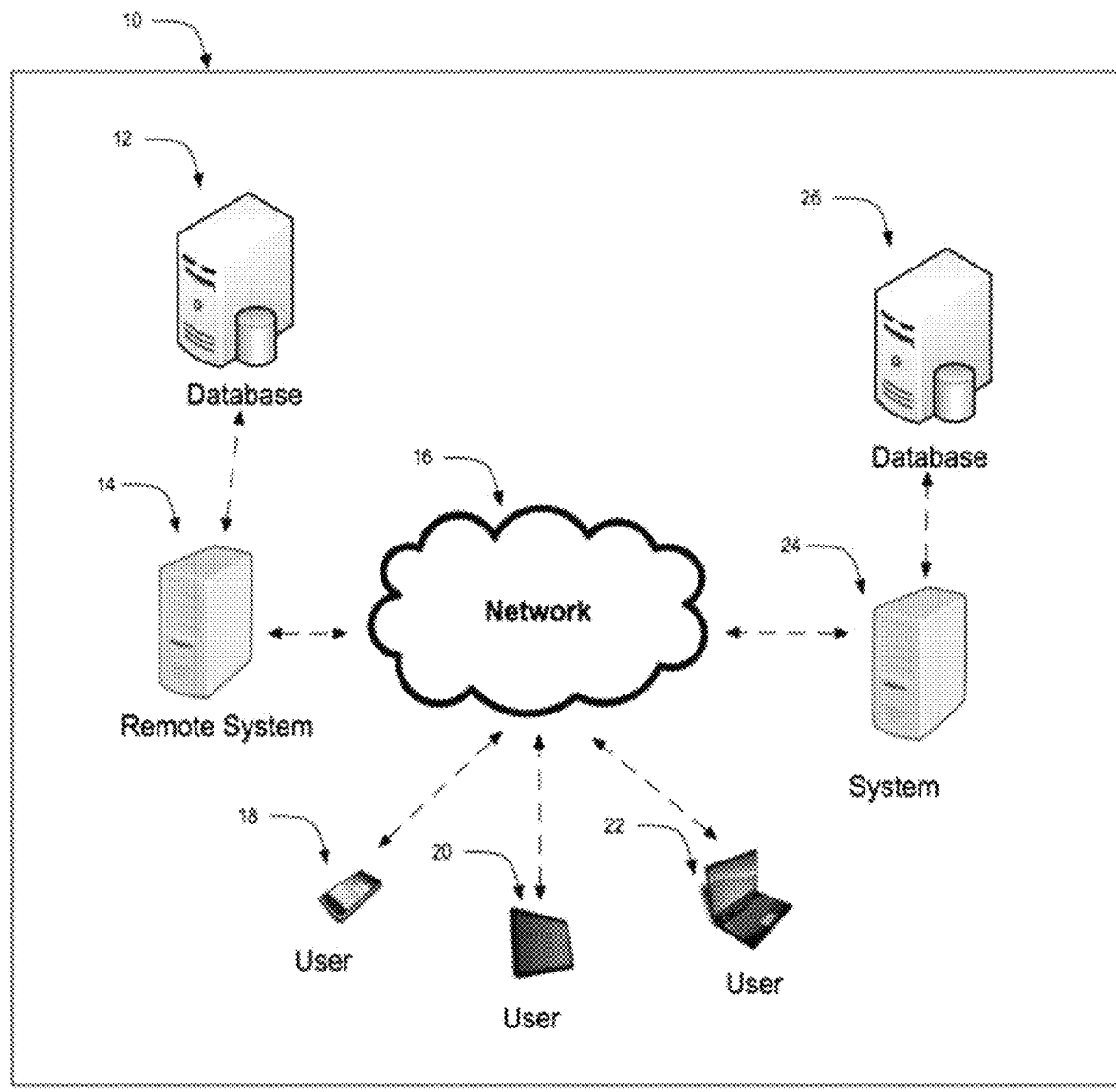
FIG. 2 illustrates a network configuration according to an example embodiment of the present application.

FIG. 2 illustrates a system diagram according to example embodiments. Referring to FIG. 2, a network diagram 10 of the present application permits a user utilizing a mobile client machine 18, a tablet computer 20, a laptop or desktop computer 22 to download from the system server 24 an application to be installed. A client's device may alternatively be a gaming system, a DVD player, or any other device that contains a processor and memory. The present application in the form of software, for example can alternately reside on the client's device 18/20/22 and can be any of a mobile laptop device and/or a personal desktop computer or a mobile device. The computing device 18/20/22 is connected to the network 16, which may be the Internet or any other type of network, through wired or wireless communication. It should be noted that other types of devices, in addition to devices 18/20/22, might be used with the present application. For example, a PDA, an MP3 player or any other wireless device, a gaming device, such as a hand held system or home based system and the like including a P.C. or other wired device that can also transmit and receive information could be used with the present application.

The user of the application can interface with the client device 18/20/22 and connect through the network 16 to the system server 24. The system server 24 can be redundant, or be more than a single entity without deviating from the scope of the application. A database 26 is directly connected to the system server 24 or connected remotely through the network 16 without deviating from the scope of the application.

A remote system server 14 communicates with the network 16. The remote system server 14 can be redundant, or be more than a single entity without deviating from the scope of the application. A database 12 is directly connected to the remote system server 14 or connected remotely through the network 16 without deviating from the scope of the application. The user-database can reside in the system server 24, or the database server 26 either directly connected to the system server 24 or remotely through the network 16.

The application of the current application resides completely or partially on the user's device 18/20/22, which can be a mobile device, but can also reside on a user's desktop computer, a personal digital assistant (PDA), tablet computer, or any other device containing a processor, memory, and an operating system. In addition, the application of the current application can reside on either completely or partially on any one of the other elements in the system illustrated in FIG. 1.

If the application of the current application resides on a device, the application of the current application is downloaded through a platform, such as an application store or market residing on the device or accessed via the device, or may be accessed through the device's browser communicably coupled to the network 16. Further, the application of the current application can be pre-loaded on the device. The current application may operate with any device such as a personal computer with a touch screen, a laptop with a touch screen, a personal computing tablet, a smartphone, a PDA or any device with a processor, memory and a touch screen.

Figure 3:
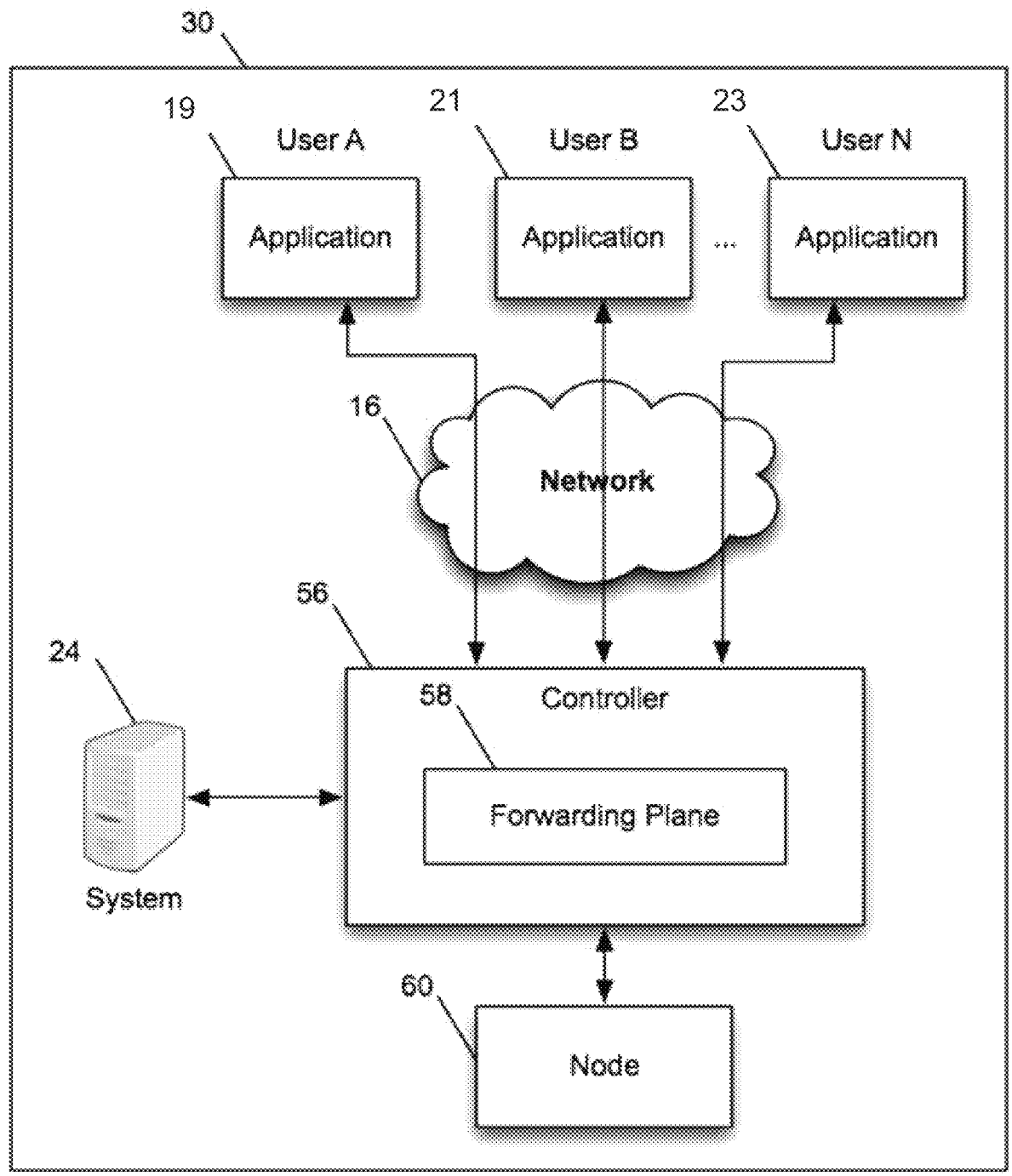
FIG. 3 illustrates a logic diagram of an application architecture according to an example embodiment of the present application.

FIG. 3 illustrates a logic diagram 30 of the application configuration of the present application. The various applications 19, 21 and 23 are correlated with the various user devices 18, 20 and 22 of FIG. 2 as like reference numerals refer to like elements in the various drawings. The controller 56 is an element in the network containing a processor and memory, and may be implemented in any element in the diagram 10, for example, the system server 24, the remote system 14, or the databases 12/26. The controller 56 is responsible for controlling the flow of a subset of information to and from the users (18/20/22).

The forwarding plane 58 is responsible for the parsing and filtering the incoming and/or outgoing data which includes, but is not limited to: 1) queuing the data, 2) forwarding the data to another network element, 3) deleting the data, 4) altering or augmenting the data which includes but is not limited to adding, replacing, and/or rewording the data. The actions are triggered by the incoming data being processed by the forwarding plane which performs at least one of parsing and filtering of the data. In one embodiment, the forwarding plane 58 can reside inside the controller 56. In another embodiment, the forwarding plane 58 can reside outside the controller 56.

The controller 56 is connected directly or through the network 16 to the system server 24. In another embodiment, user A 18, user B 20 and user 'N' 22 are utilizing the same present application through different devices. In another embodiment and as example only, the application 18/20/22 can be connected to the controller 56 without the network 16. In another embodiment, the node 60 can be communicably coupled to the controller 56 connected through the network 16.

Figure 4:
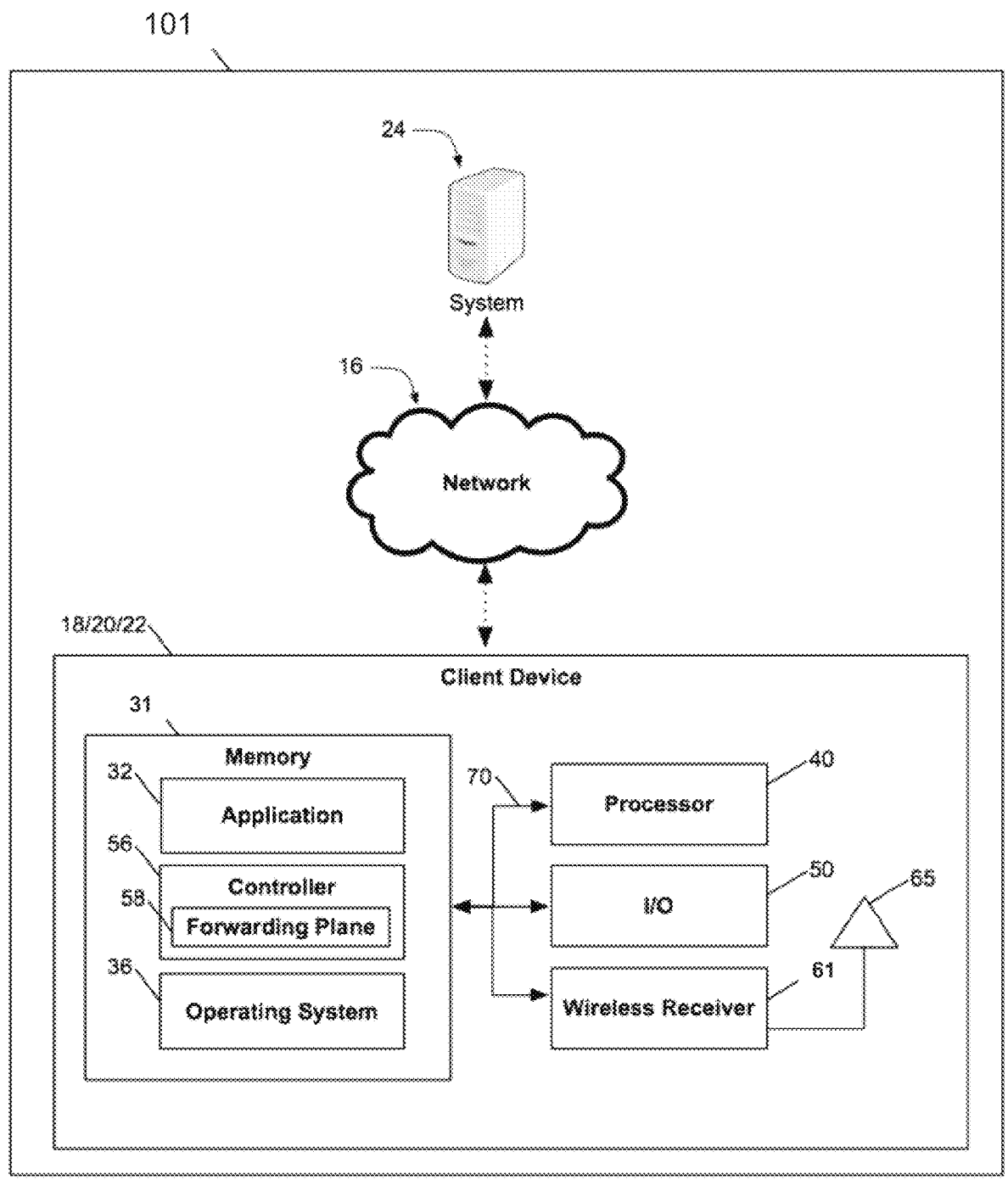
FIG. 4 illustrates an example client device configuration according to an example embodiment of the present application.

FIG. 4 is an example configuration 101 of the controller being part of the client device. Client device 18/20/22 preferably includes microprocessor 40, memory 31, input/output (I/O) components 50, wireless receiver 61 and antenna 65. In an example embodiment, these components of mobile device 18/20/22 are coupled for communication with one another over a suitable bus 70. Memory 31 is preferably implemented as non-volatile electronic memory, such as random access memory (RAM) with a battery back-up module (not shown) such that information stored in memory 31 is not lost when the power to client device 18/20/22 is shut down. A portion of memory 31 is preferably allocated as addressable memory for program execution, while another portion of memory 31 is preferably used for storage, such as to simulate storage on a disc drive. Memory 31 includes operating system 36, one or more application program(s) 32, such as a personal information manager or PIM as well as a controller 56. A forwarding plane 58 exists in the controller 56. During operation, operating system 36 is preferably executed by processor 40 from memory 31. I/O components 50 are provided to facilitate input and output operations from a user of client device 18/20/22. The client device 18/20/22 is coupled to the network 16.

In operation, the sent and/or received data to and from a user device 18/20/22 of the current application 32 is either sent out, or received by the application 32. The messages are "filtered" through the controller 56 via certain filtering criteria. The controller 56 communicates with the system server through the network 16. Unfiltered or 'raw data' can potentially be a duplicate of previously received information, or information that the user may not be interested in pursuing due to various reasons. This application filters and examines incoming and outgoing information that may be considered uninteresting to the user or the recipients of the outgoing information.

Figure 5:
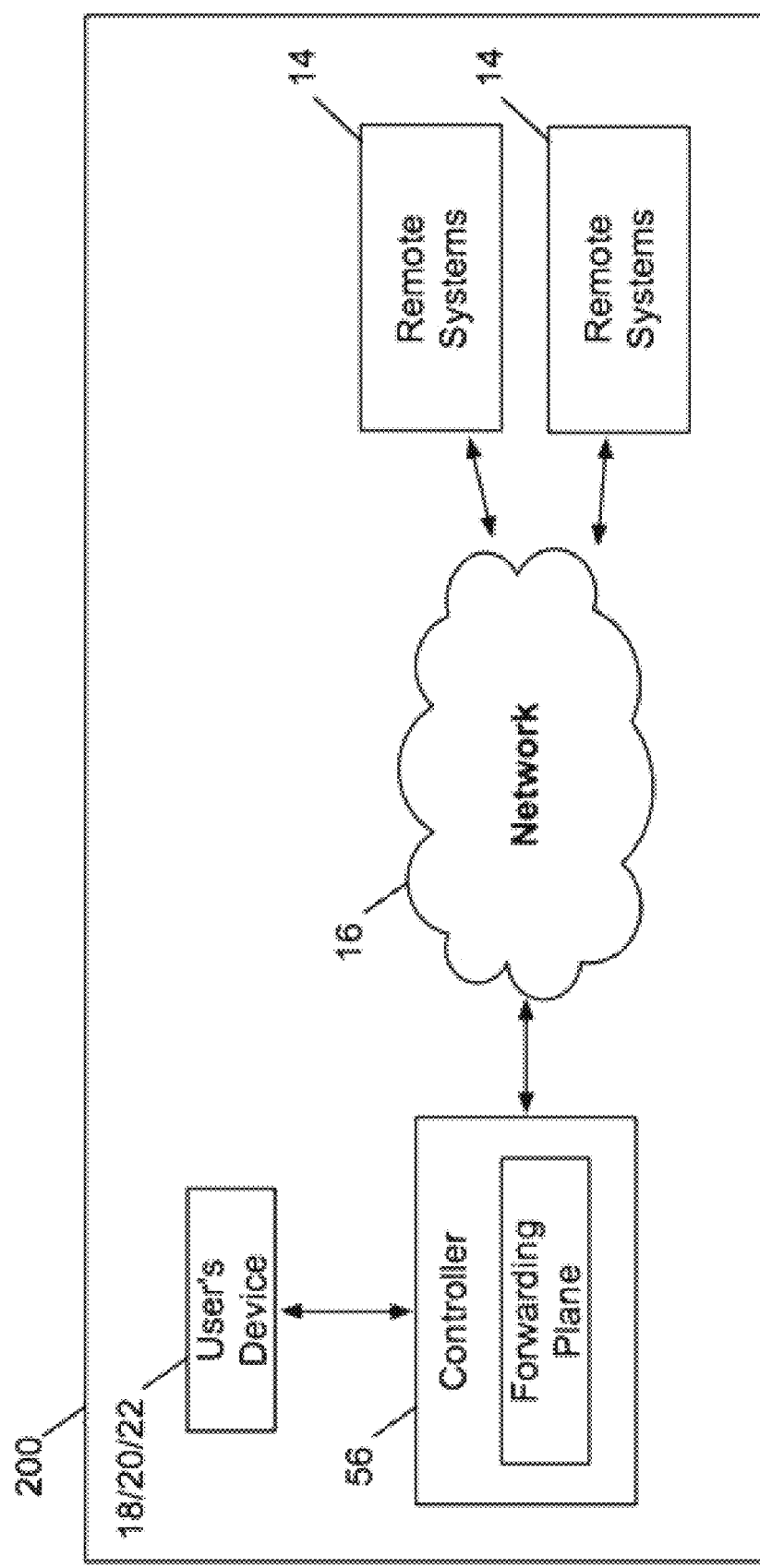
FIG. 5 illustrates another example logic diagram according to example embodiments of the present application.

FIG. 5 illustrates an example configuration 200 of the controller being outside the client device 18/20/22. Referring to FIG. 5, the controller 56 is across the network from the remote system servers 14 and the user's device as depicted by the network 16 and the other network elements.

The client device 18/20/22 interacts with the controller 56 so message(s) are first passed through the controller 56 before being sent to the network 16 for outgoing messages or sent to the client device 18/20/22 for incoming messages.

In an example where further information is sought, the controller 56 accesses remote systems devices 14 through the network 16. The remote system devices 14 may be functionally setup via an application program interfaces (API). Using the APIs or a similar interaction, the controller 56 may obtain information that offers additional input that may be sent to the client device 18/20/22 without the user directly requesting additional information. The remote system devices 14 may be any remote element in the network containing a processor and memory, and which is coupled to the network 16 through any communication protocol normally utilized in communication between a computer and a network.

To provide a procedure of analyzing classifying and/or controlling outgoing and incoming messages, a message gateway or 'controller' 56 may process all such outgoing messages by filtering such messages before leaving the organization. This permits some control over the messages from an organization and validates the messages being delivered to the network. In operation, messages are "captured" in the controller 56 prior to being transmitted. Once captured by the controller 56, the messages are compared to previously delivered messages to verify that the outgoing messages are different from the previously logged messages. Other procedures may include determining the messages are similar but from a different sender/receiver and/or whether the messages are provided in a different format.

Messages captured may be compared to those that were previously received and compared against those that are considered "real time" and those that are considered historical messages. In one embodiment, a predetermined value is set to determine which messages are real-time messages and which are historical messages (e.g., 2, hours, 4 hours, etc.).

Incoming information may be delivered to the user such that the information is optimized to be of a greater level of interest to the user than would normally be received. This information may be from other people/users or generated from the system server 24 based on interaction between the system server 24 and the controller 56/forwarding plane 58. The system server 24 may analyze the information being received and determine that the information is a duplicate of already received information, or determine that other related information would be more useful to the user as the preferences and characteristics of the user are identified.

The controller 56 is responsible for handling the messaging both incoming and outgoing to the client device 18/20/22. Messages are sent through the controller and pre-processed prior to being transmitted. Once processed, the messages are either sent up to the client device 18/20/22 or to the network 16 or node 60 of FIG. 3. In one example embodiment, data contained in the controller 56 may contain more real-time data than historical data as compared to the system/DB 24/26 which may contain more historical data. The controller 56 decides how to respond to users by analyzing the incoming messages and interacting with the previous messages and other data stored in a coupled element, such as the system server 24. The forwarding plane 58 may be located inside the controller 56. This element is responsible for forwarding the message(s) to obtain more information.

When processing the data in the forwarding plane 58, the controller 56 can queue the data for use at a later time, forward the data to another network element, delete the data, alter and/or augment the data (i.e., add, replace, reword, include image/video from a data source) prior to transmitting the data to its intended destination. In operation, the data the user is transmitting may be modified based on user preferences, user characteristics and other user based criteria prior to transmitting the data from the user device.

The application may perform certain operations in order to understand the user. This understanding relates to not only the interests of the user, but the normal interactions between the user and other people. For example, interest groups, such as other people in the user's organization, work environment or other people in other work environments. The current application may determine the user's characteristics and interests and how the user interacts with others through interactions (i.e. messaging, applications, etc.).

The application can gain an understanding of the user by examining any or all of information that has been received by the user device, such as when the user is online, advertisement information that the user may have selected on a user interface, searches submitted and information requested, groups that the user has obtained member, emails that the user sent or received, calendar events currently subscribed to the user, historical web surfing habits stored in web history locations, a current location of the user as obtained from IP address, GPS, or other location functions, online games that the user has accessed, digital video recordings (DVR) programs, live video streaming/Internet protocol television (IPTV), web-based shows, television-based shows, radio/music platforms/music applications/music players, GPS, cellular/mobile device usage, etc.

In one example, the user's history of online web access may include the web history stored in a web history file on the user's device and data stored in the network 16. All the web browsers retain Internet surfing information in the form of files stored on the user's device. These web history files can be processed to determine information that can aid the application in delivering messages related to the user. For example, a request initiated by a user device may reference the web history file for additional information and may include such additional information or at least cross-reference the information in the request message to confirm or add additional information based on information in the web history file.

Other options can be employed to gain an understanding of the user's previous Internet surfing history. For instance, GOOGLE and YAHOO, offer free services that can be utilized to perform email capabilities, manage groups, search the web, manage information, such as advertisements, manage calendar activities, manage documents, as well as many other services. This approach differs substantially from the conventional approaches since the current application provides the ability to create/modify messages based on information that has appeared in the user's information sources.

In another embodiment of the current application, the application can continue to monitor the user's information and provide updates to the search results reflecting changes in the user, such as the user device location or newly identified interests. The user's data results from the user's local data files (i.e., tracking files) or client device 18/20/22 can be weighed against the user's data results returned from the remote system server 14 so the weighing operation can determine a priority of the results. The remote system server 14 can include information pertaining to the user and stored in the cloud or network 16. When obtaining the user's data, the latest data with a most current timestamp can be given a higher weight than older data.

Figure 6A:
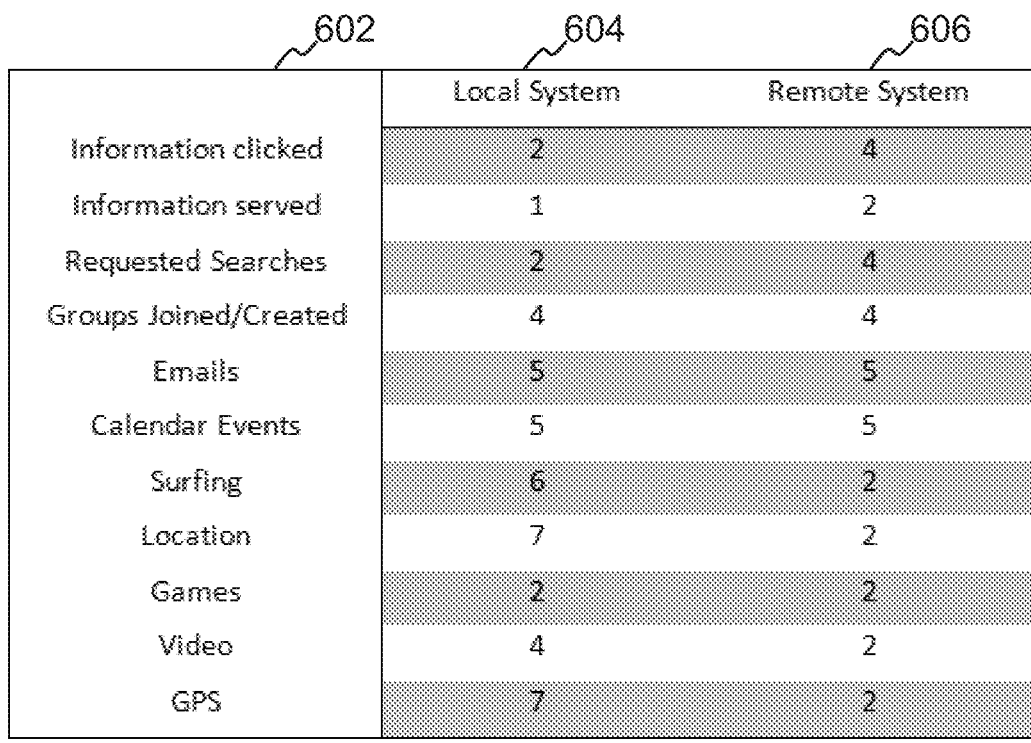
FIG. 6A illustrates an example table of saved results according to an example embodiment of the present application.

The table in FIG. 6A demonstrates an example weighing configuration that can be utilized to determine which data is most relevant to the current application. The table 600 includes various categories 602 which may have a record on more than one machine. For example, the information clicked by a user may be logged in both the local system device 604 (i.e., local server, user device) and/or at a remote server device 606. Categories may include the information clicked, information served, requested searches, groups joined/created, emails, calendar events, web surfing queries/ results, present and/or previous locations, games accessed, video accessed, and/or GPS location(s). The numbers in table 600 represent weights assigned to the various locations and categories. For example, the highest or greatest weight of 7 may be assigned to a location of the user device or "local system". A user's present location for purposes of this example is the highest weighted category for a particular location with a weight of 7, or in this example (7×the number of instances recorded).

Table 600 illustrates the possible weights assigned for each category of the user's interests or characteristics. Weights are assigned according to the validity of the information found in that recording system (local or remote). The location of the user as determined by the IP address or determined via GPS data would be more accurate when obtained from the local system than from the remote system as the local system would have the most up to date and correct data. For calendar events, because it is unknown whether the user uses an online calendar or a calendar that is only local to the user's system, the weight may be the same in those instances. Both the local and remote systems can contain data from the user's current calendar, thus it would be assigned the same weight. The user's Internet access history would have a higher weight from the local system as this is where the most up-to-date surfing history is normally stored (i.e., cached pages, queries, etc.). Table 600 is an example of a weighing configuration that can be incorporated into the application. Other weighing applications can be utilized without deviating from the scope of the current application.

Figure 6B:
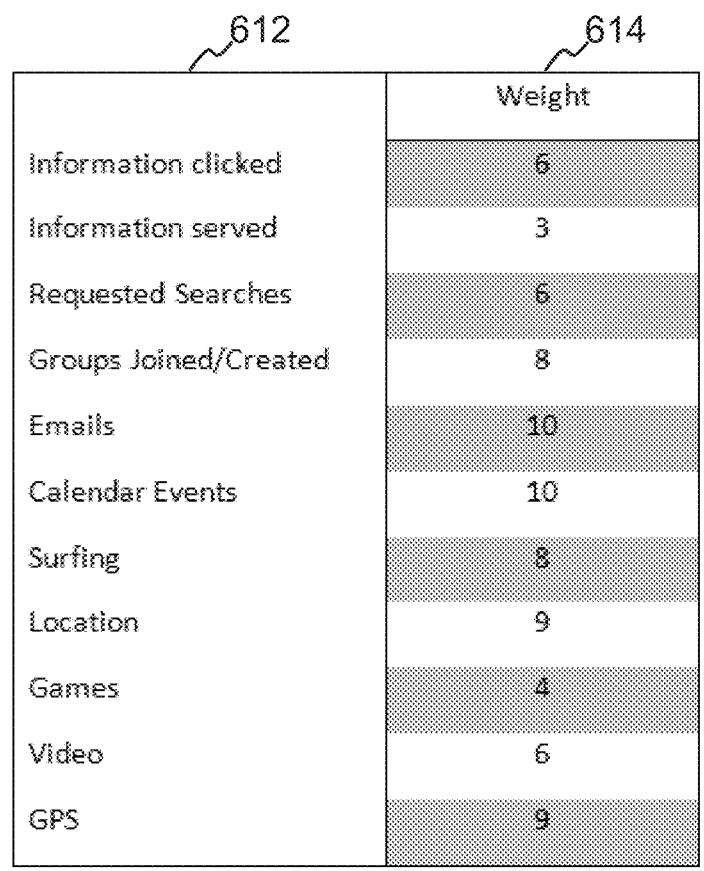
FIG. 6B illustrates an example table of weighted results according to an example embodiment of the present application.

In FIG. 6B, when results are received from both the local and remote system devices, the table 610 may aid in determining the priority of the data with a category column 612 and a corresponding weight 614, however it can be seen in table 610 that both emails and calendar events have the same highest level of weight for both local and remote system servers. If data is received from both systems, the data with the latest timestamp can be utilized in the application.

FIG. 6B illustrates the table 610 with the weights assigned to the results and the priority of the results are associated with the value given to that particular result. The weights assigned in table 610 are calculated by adding the two values in table 600 for each row. This is interpreted in understanding that when the results are weighed, both emails and calendar events have the higher weight than other results, as both emails and calendar events are usually two of the higher utilized applications on a daily basis, and would thus contain the most up-to-date data or the data reflecting the current "temperature" of the user. In another embodiment, any other weighing system may be utilized without deviating from the scope of the current application.

Figure 6C:
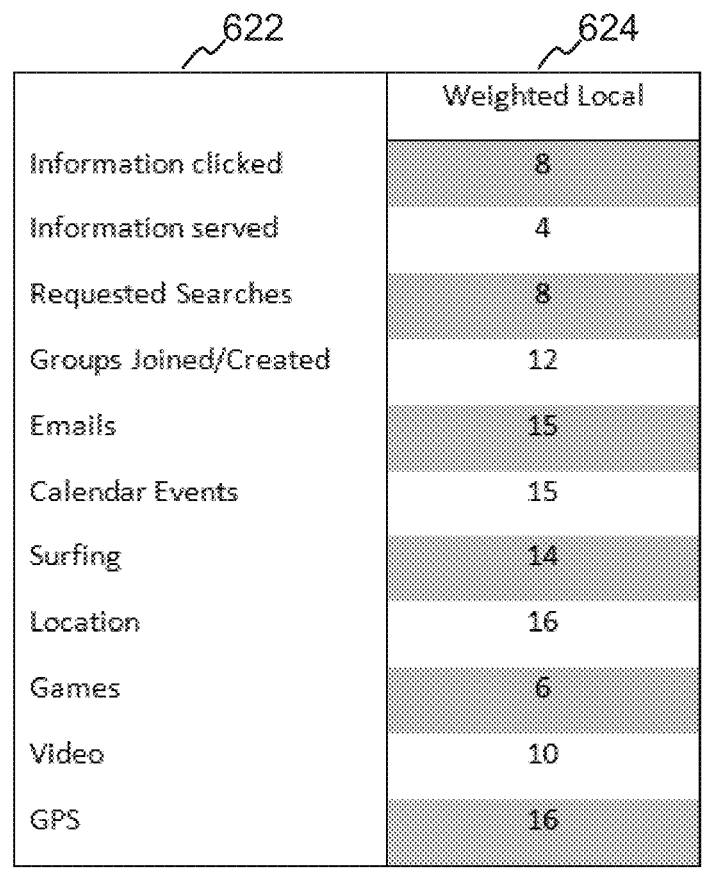
FIG. 6C illustrates an example table of weighted local results according to an example embodiment of the present application.

FIG. 6C illustrates table 620 having weights for priority to the local system server. Table 620 calculates the weights and the results so the values in table 620 are calculated by the following expression: Local Weights×2+Remote Weights. This weights the results from the local system device as twice as much as the weights of the results from the remote system device.

Figure 6D:
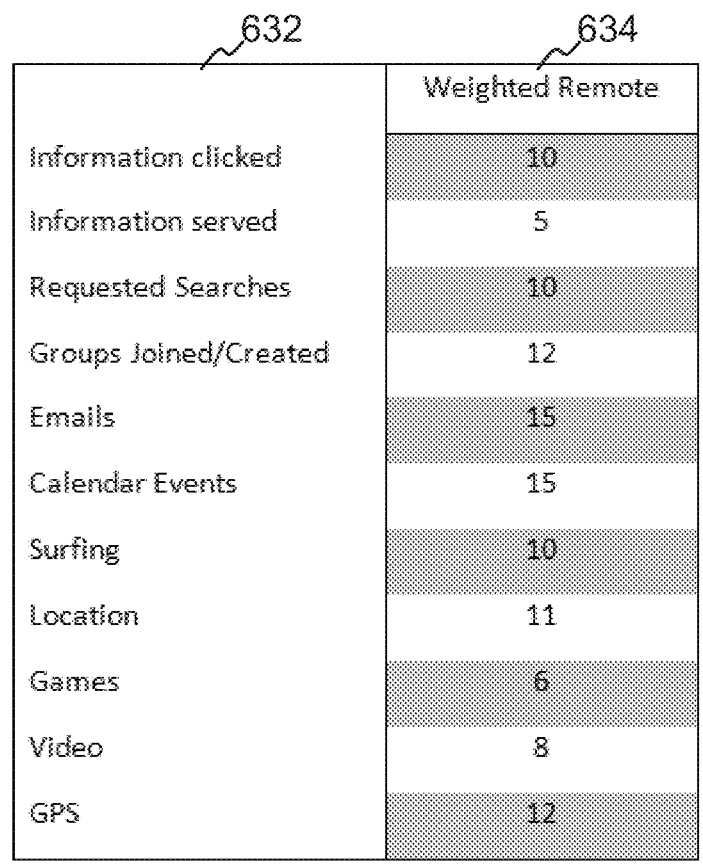
FIG. 6D illustrates an example table of weighted remote results according to an example embodiment of the present application.

In another example of FIG. 6D, the table 630 includes weighing the results by performing the reverse calculation: Local Weights+Remote Weights×2. This procedure weights the results from the remote system device as twice as high as the weights of the results from the local device. In another example embodiment, any other multiplier or weighing system may be utilized without deviating from the scope of the current application. Other types of weights can be determined according to the origination of the result (local vs. remote), various combinations of the results, and the time stamp of the results.

FIG. 6E includes a table 640 with a symbol and a corresponding function. Referring to table 640, the symbol 642 'A' is mapped to the 'Information clicked' function 644 and the symbol 642 'B' is mapped to the information served and so on. In this example table 640 maps each of the functional areas of the possible results to a symbol that is then used in the equations of FIG. 6F to determine the weights for various scenarios.

FIG. 6F provides a table 650 with an equation 652 and description 654 of the equations. For instance, K13+[A,B, C,D,E,F,G,H,I,J] is the GPS local×3+other data, G12+[A, B,C,D,E,F,G,H,I,J] is the surfing history local×2+other data. (Fr+Dr)2+[A,B,C,E,G,H,I,J,K] is the remote groups and calendars×2+other data, If ([A,B,C,D,E,F,G,H,I,J,K]time-stamp<=5 days) then [A,B,C,D,E,F,G,H,I,J,K]2 is data×2 if the timestamp is recent. G12+[A,B,C,D,E,F,G,H,I,J] is the surfing history local×2+other data, (A+K)2+(A+E) is the information clicked+GPS>>information clicked+email.

The calculations described above and with reference to table 650 are examples of the functionality of the current application where the calculations are used to determine the interests of the user. In another embodiment of the current application, the user has the opportunity to customize the weights of the results when creating the medium. For example, a GUI window is provided that permits the user to determine if specific results have a higher or lower weight than what the system application originally determined. The system of the current application can utilize the customized weights in determining the content on the created medium.

In another embodiment, the user may have the opportunity to validate the results by acknowledging the result from the system server 24. The client device 18/20/22 receives notification of the interest found from the system server 24 by receiving a notification routed through the network 16. The user can interact with the display to accept the found interest or deny the interest. A response message is returned to the system server 24 routed through the network 16 to complete the correspondence. The GUI window may be used to adjust the weights and is available to the user to make adjustments and determine how the system behaves when determining how the results are utilized in creating the search results.

In another embodiment of the present application, the handling of the lack of data contained in the Internet files is performed. The files may not contain relevant data due to the ability for the user to erase their history via the browser, or to enable "private browsing". Private browsing is gaining more popularity among browsers. When a user enables private browsing, the local system does not store local tracking files. If a user of the current application has private browsing turned on, the local system may not contain updated tracking files, thus when querying both the local and remote systems, the remote data can be given a higher weight due to the lack of the local data or an older and unacceptable timestamp (i.e., older than threshold time reference).

In another embodiment of the present application, the application is developed on both a web-application operating inside of the user's Internet browser, as well as an application on the user's desktop. In the case of the application operating in the user's browser, a pop-up operation may take place permitting the application to alert the user to notifications, similar to what the desktop application can permit. This ensures that notifications could be successfully sent to the user regardless of the platform developed. In another embodiment, any other weighing operation may be utilized without deviating from the scope of the current application.

Figure 7:
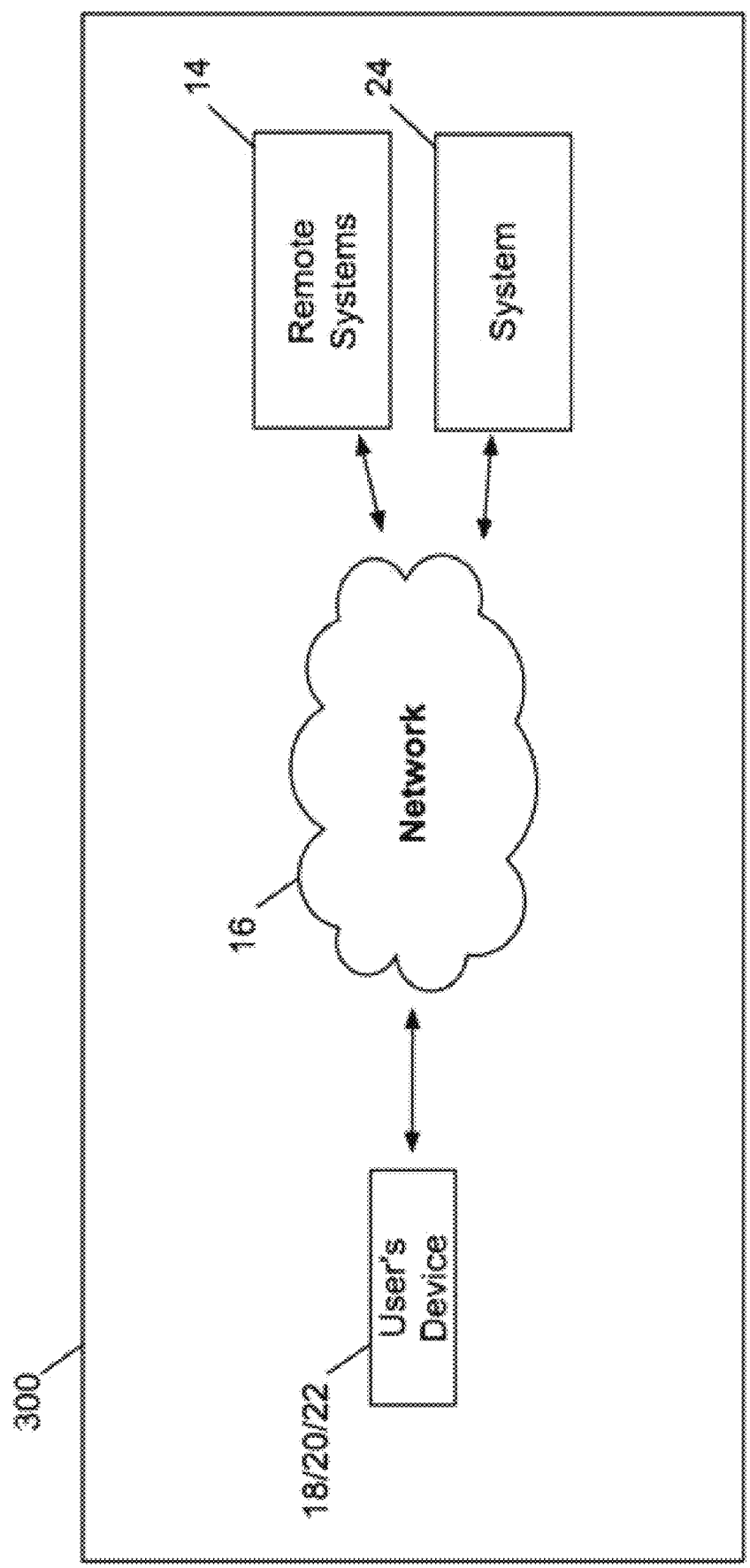
FIG. 7 illustrates another example logic diagram according to an example embodiment of the present application.

FIG. 7 is an example of an implementation of the current application 300 operating on network elements utilized to obtain and store the characteristics of the user. The user characteristics may be obtained in the client/user device as well as through the monitoring of the user's interactions with others devices, web sites, etc. These characteristics may be obtained through the local client device 18/20/22 and/or the remote system server 14, which is accessed through the network 16, which may be the global Internet. The remote system 14 may be a remotely located database similar to companies offering cloud services, which permit user interactions, and user data that is stored in a remote location, accessed through the network 16. The other system server 24 may be utilized to store the interests and/or characteristics of the user. In another embodiment, there may be a database coupled to the system either locally or remotely such that the database may be utilized to store the interests and/or characteristics of the user. The application monitors the activity of the user through parsing the messages and interactions between the user and outside parties and may interject suggestions that the user has not particularly requested.

The application maintains an understanding of the characteristics and interests of the user through functionality described in the following examples. Using this identified understanding, the application may make assumptions and offer suggestions to the user without the user requesting the information. For example, the user may be interacting with other parties and communicating about 'investments'. The user may be blogging, chatting, transmitting text and/or emails messages, etc., all of which are processed and categorized for terms, phrases, transactions, etc. The identified category of information 'investments' is extracted and inquires can be generated about how to invest money into different investment strategies. In one embodiment, the messages are parsed by the controller 56 and/or the system/DB 24/26 and the messages (i.e. conversation) are stored in the system/DB 24/26 for later analysis by the system/DB 24/26. After an appreciable time period, either automatically calculated or configured by the user in the application's configuration area, the controller 56 and/or the system/DB 24/26 initiates functionality to interject additional information into the conversation. The messages in the current conversation are stored in the system/DB 24/26 and are available for analysis by the system 24 to determine areas to analyze. The system 24 may determine that the conversation is regarding investments, stocks, bonds, etc.

In another embodiment, the current application may be functionally employed upon receiving a "trigger word" as received by the user. This trigger word is a predetermined word or phrase determined by the user. When a received trigger word is processed, the functionality to execute the current, application functionality is initiated. Such a trigger word may be established by the software's configuration module such that the user is able to input the trigger word through either speech input to the device 18/20/22 or text data entered. The user may speak or enter text equal or comparable to the trigger word, permitting the software to process the received text in the current embodiments. Natural language processing (NLP) may be utilized to analyze the received speech and/or text to determine trigger words that may be equal, or mostly equal to the predetermined trigger word.

Continuing with the same example, the system 24, having access to the characteristics and interests of the user through determines that due to the age, financial situation, marital status, debt ratio, etc. of the user of the application, the user is justified to research bonds as an investment option since bonds have a particular demographic of parameters which have been satisfied by that user. In another embodiment, the system having access to interactions, such as through an API with the internal or external investment application in use by the organization, is able to obtain the current investment options selected by the user. The application can then generate a more direct and correct advisement to the user. For instance, the system determines that no bond funds are currently being invested by the user's account and determines that, according to the characteristics of the user (i.e., minimum account balance, investment goals, etc.) that bond funds should be looked considered. A message is then generated and sent to the client device 18/20/22 of the user of the application. This message states that the system has determined that research/purchases should be performed by that user on 'bond funds'. In another embodiment, the application displays the rationale as to why bond funds should be researched. In another embodiment, the system retrieves and displays a list of bond funds that may be of interest to the user using the characteristics of the user obtained previously.

In another embodiment, the rationale as to why the list of bond funds should be researched is provided as well. In another embodiment and continuing with the same example, it is determined by the system server 24 that among all of the investments that the user is currently investing, 30% of the investments contain a particular stock. This is accomplished by the system server 24 in either determining the characteristics and/or interests of the user as described and/or by interacting with the investment application in use by the organization, which may be internal to the organization or outside of the organization. Therefore, none of the recommended bond funds contain that particular stock, which permits the user's investment portfolio to be more diversified.

In this example embodiment, the user is able to submit a query to the application including one or more questions and the system server 24 is able to utilize the personal aspects/characteristics of the user to provide a timely, correct answer to the question. The application gains an understanding of the user's personal characteristics by analyzing elements of previous transactions as described in this disclosure. For instance, the application understands aspects of the user including but not limited to the user's gender, geographic location, income, family, sports interests, hobbies, etc. Having this information permits the application to recommend products and applications that relate to the individual aspects of the user, not a simple general interest but an interest that directly relates to the user. For example, there exists a new benefits plan in the user's company. There are different 401k investment plans among with the user is able to choose from and incorporate into his or her portfolio.

The user may not understand the choices presented in the user interface and may submit a question to the application for assistance into which type of investment would be best suited as a path of investment. Accordingly, the user sends a message within the application interface asking: "Which investment plan should I consider in the new 401k plan?" This message is sent from the user's client device 18/20/22 and the controller 56 receives the message and it is parsed. The controller 56 sees that the message is a new question and that the message is not part of an existing conversation and therefore sends the message to the system server 24 for further processing. The message is sent to the forwarding plane 58, which forwards the message to the system server 24. The system server 24, through interactions detailed in the section determines the following characteristics of the user: male, 33 years old, married, 2 children, etc.

The system server 24 interacts with the application with a published API permitting the application to query the user's software program "investment software" with defined parameters and receive results from the software. In this example, the parameters sent to the software application are the characteristics of the user which were previously obtained. Having the detailed characteristics of the user, the system server 24 can automatically obtain the best investment path for the user without interfacing with other people. This occurs automatically through the interfacing with the published API(s).

The system 24 determines that, given the characteristics of the user, the best investment path is an investment product entitled "Moderate Growth". Furthermore, the published API returns a web address in the form of a universal resource locator (URL) that directs towards more information detailing the specific investment functionality of the moderate growth investment product. The system server 24 responds to the user by sending a message detailing the 'Moderate Growth' investment product along with the URL for the user to gather more information on the product.

FIG. 7 illustrates a system signaling message flow that automatically responds to a question according to example embodiments. Referring to FIG. 7, the message flow 1600 illustrates the system server 24 automatically answering a question from the user. In a background process of the user device's operation, and without the interaction by the user, the application may perform certain actions at intervals that are predetermined by the application and set in the configuration area of the application. Those actions may include querying the client device 18/20/22 to determine the latest characteristics and/or interests of the user. The messages 1604, 1606, 1608 and 1610 reflect the interaction between the system server 24 and the client device 18/20/22 in determining the most recent characteristics of the user. The user characteristics 1602 may be stored on the system server 24 and the more recent characteristics can be identified and updated via a 'Determine Characteristics' (DC) message 1604 and may be repeated at each of the predetermined intervals to update the DC information.

The system server 24 executes a process to determine the characteristics of the user 1602. This process involves the sending of a message "Message Determine Characteristic (DC)" 1604, which is sent to the network 16 and routed 1606 to the client device 18/20/22. The client device 18/20/22 responds with the current characteristics of the user 1608 sent to the network 16 and routed 1610 to the system server 24. The user device 18/20/22 sends a message 1612 with the contents: "Which 401k plan should I choose?" The message is sent to the controller 56 which parses and sends the message to the forwarding plane 58 via message 1614 and it is routed to the system server 24. The system server 24 processes the text and utilizes the characteristics as determined by the process 1602, and determines the best plan as it interacts with the API of the benefits software. The system server 24 determines an investment product that would be best for the user utilizing the characteristics of the user. A response message 1618 is sent to the controller 56, which is sent 1620 to the user's client device 18/20/22. Additionally, a URL is provided to the user device so the user is able to select the link in the response message to gain more information on the investment product that is recommended.

In another embodiment, a determined time period is established permitting the user's characteristics to be determined 1602 and received from the system server/database 24/26 via a Msg (DC) 1604. This time period is either automatically configured (hard-coded in the software), or determined by the user in the configuration module of the software so the user is able to specify the amount of time to elapse between obtaining the current characteristics of the user (i.e., minutes, hours, days, weeks, months, etc.).

Assume that the user is receiving messages that pertain to a new investment fund that the organization is offering. The messages may be from other users inside or outside the organization. Furthermore, these messages originate from users that vary in different user characteristics, for example, age, gender, location, family size, debt, income, etc. The current application offers messages that pertain more to the user as the current application has an understanding of the user's age, race, income, gender, debt, etc. These messages also can be obtained by experts in the current category and not by other users. In another embodiment, additional information can be obtained by knowledgeable users who are not considered a professional, for example, a nonprofessional user who is familiar with the subject. Furthermore, assuming that the messages pertain to investments, such as 'large cap' and 'small cap' funds, yet do not include 'bond funds' due to their higher risk and flexibility, the current application can create and forward other messages pertaining to bond funds as it understands the age and other characteristics of the user. Or, the approach may be to not take additional risk with investments if the user is past retirement. The aggressive stock funds may be directed to younger-aged users who have the ability to weather more risk in the investments.

The messages may be received from other users, or obtained by more professional message originators in the given field. The system server interacts with the client device 18/20/22 of the user to determine the characteristics and interests of the user such as the user's age, gender, interests, marital status, income, etc. These characteristics permit the system to process and obtain an understanding of the nature of investments that would be beneficial to the user. The SDN network approach may be utilized to queue and utilize priority to permit the application to send and receive packets according to the application's requirements and actions, which may change over time.

In the various examples, the system server 24 is obtaining information from a variety of sources (i.e., the client device 18/20/22, the database 26, the Internet 16, etc.). This information is gathered in the system server 24 and the messages are originated and sent to the user(s) in the conversation offering helpful data that was not specifically requested. As an example, assume that a current legal issue scenario has various people providing input via messaging that is public or internal to the organization. Various people are providing input to the issue but the user may not understand the background of those that are providing input. Multiple messages may be received that are similar in nature, the system may collect and queue those messages and then permit these multiple messages to be delivered along with previous messages in a similar category.

In one example, the application may provide input from a more legal aspect by citing a recent court ruling or case law that adds legal perspective to an issue. For example, the issue could be the hiring of foreigners in the organization. A recent case where the issue is either same or similar may have been heard in court and the result of the ruling can be presented to a question or in response to certain activity.

The system server 24 may obtain information from multiple sources and submit data to the user(s) devices participating in a current conversation. The system server 24 can monitor the conversation so the messages in the conversation are parsed and in one embodiment stored in the system/DB 24/26. The application also can query professional sources, such as through published APIs from entities that are able to offer a more professional approach to the subject being discussed. The results of the query(s) permit the system server 24 to interject messages into the current conversation that provide a more professional view of the subject in the conversation.

Figure 9:
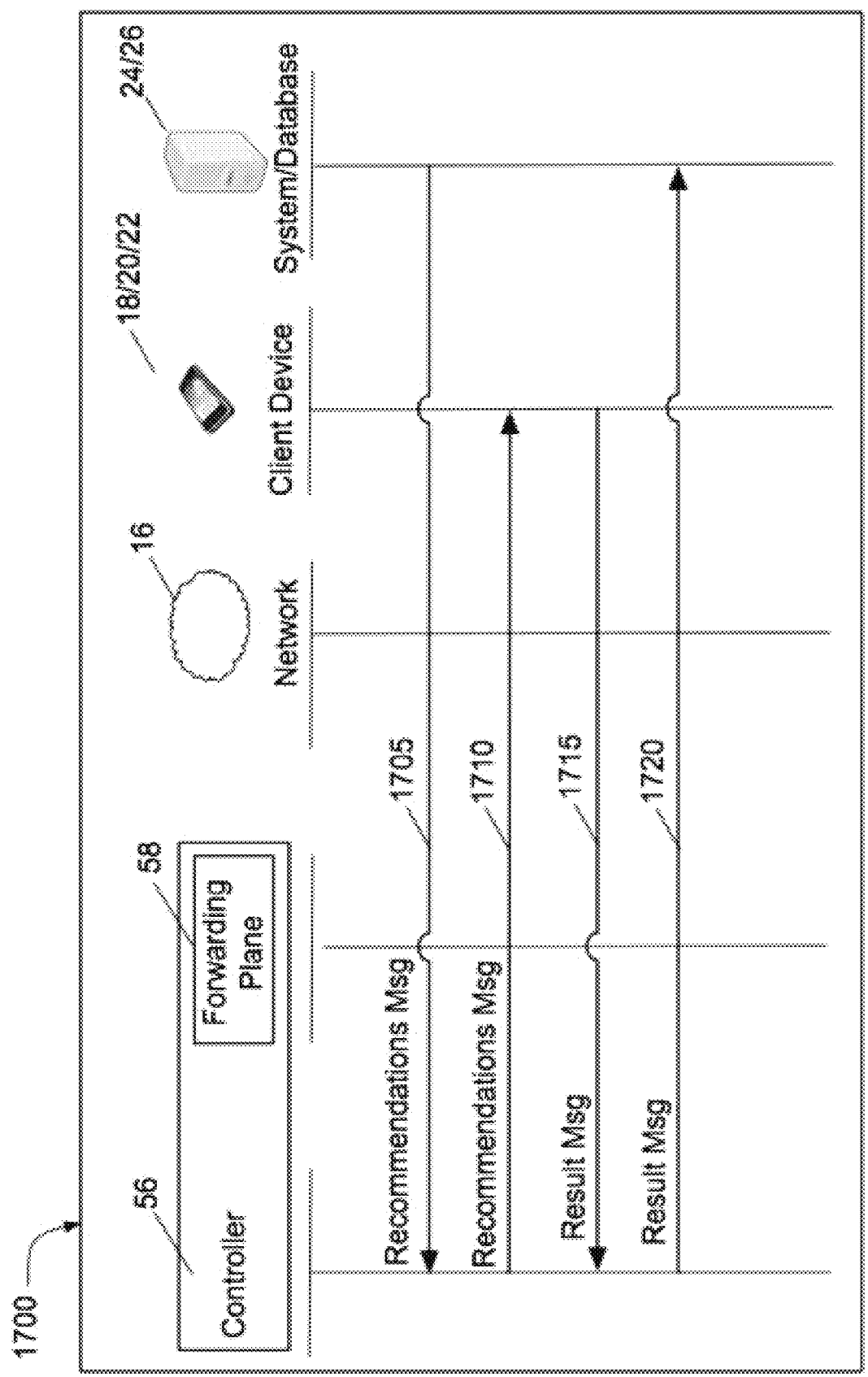
FIG. 9 illustrates another system signaling diagram according to example embodiments of the present application.

In another embodiment of the current application, the system server 24 initiates input automatically and without any input or query from the user. FIG. 9 illustrates an example flow diagram 1700 of a user initiating input automatically. Referring to FIG. 9, the diagram 1700 illustrates a message flow of one possible implementation of the current application 1700 illustrating the system 24 automatically initiating a recommendation to the user(s).

In operation, the system server 24 sends a recommendation message 1705 after determining that a recommendation is beneficial. This can be determined by the monitoring of the user's interactions (texting, email, groups, etc.). The recommendation message that is created is routed through the network 16 and delivered to the controller 56. The controller forwards the recommendations message 1710 to the user's client device 18/20/22. The message can be routed through the forwarding plane 58 in one example. As the user did not request the data in the recommendation message, there may be an indication in the delivery of the information of the recommendation message that the information is from the application/system of the current application such that the user is easily able to identify the data's origin. This can include a title component in the GUI component of the delivery of the data in the recommendation message to the user's client device 18/20/22 or some other indication (e.g., color change of the window component, different typeface of the text in the window component, etc.).

In another embodiment of the application, there is a component displayed on the user's client device 18/20/22 that permits the user to interact with the data of the recommendation message 1710 on the display of the client device 18/20/22. This component can be a text input component, a button component or any other component permitting for interaction. Upon interaction with that component, if necessary, a result message is sent to the system server 24 to process the interaction. This result message 1715 is routed through the network 16 to the controller 56. The controller forwards the message through the forwarding plane 58 and the message 1720 is routed through the network 16 to the system server 24. As an example, we assume that a user had an adjustable rate mortgage (ARM), which will automatically adjust to a higher payment in 2 months. The system server 24, through interacting with the mortgage entity (for example published APIs), identifies that there will be a jump in the interest rate of the user's mortgage in 2 months. Without any request from the user, the system server 24 and the application initiates a notification to the user. This notification permits the user to prepare for the increase in monthly payments of the mortgage and further exemplifies the benefit of the current application.

Figure 10:
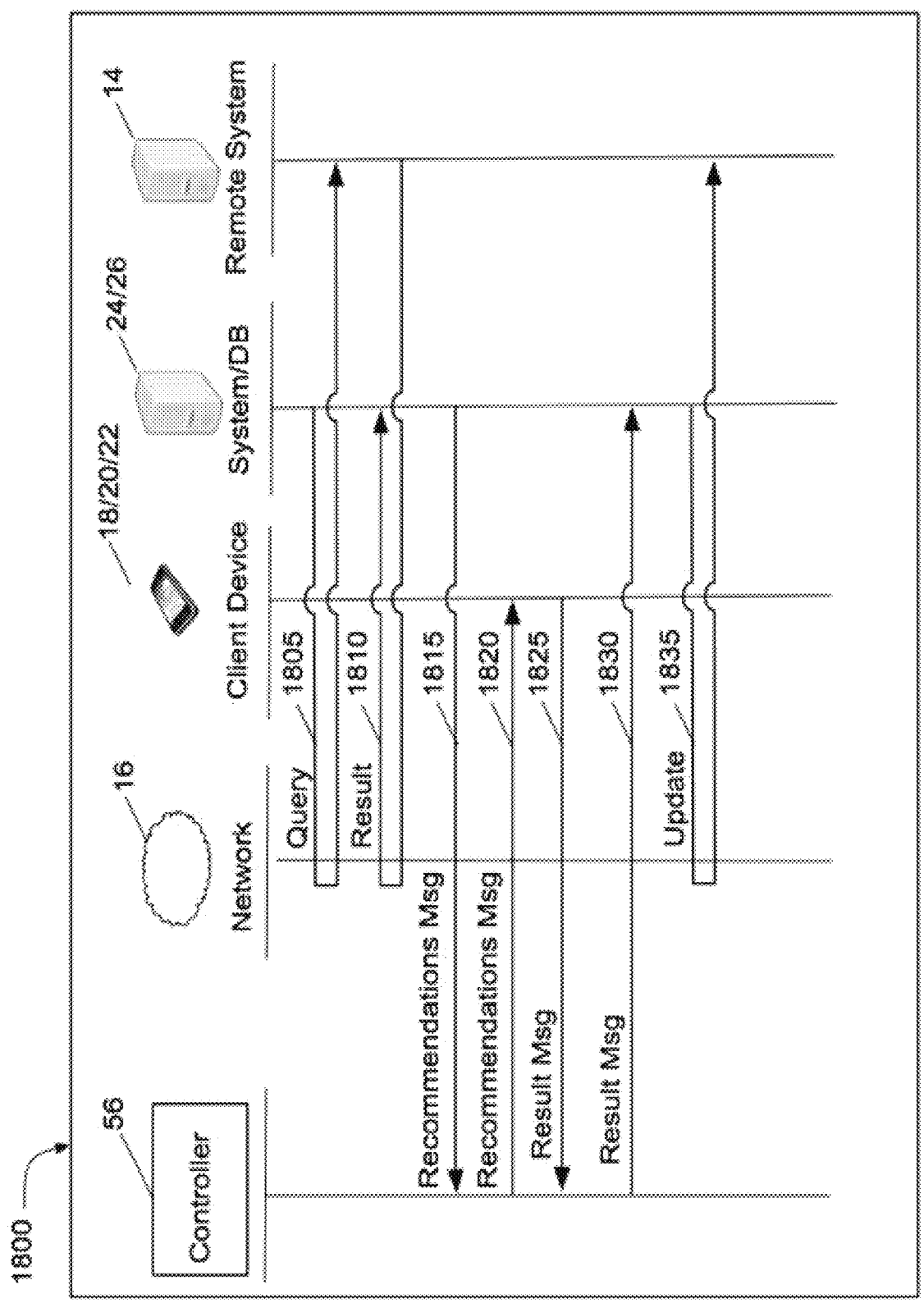
FIG. 10 illustrates yet another system signaling diagram according to example embodiments of the present application.

FIG. 10 illustrates a message flow of one possible implementation of the current application. Referring to FIG. 10, the diagram 1800 illustrates the system server 24 automatically informs a user of an anticipated change to mortgage payments. The system server 24 queries the remote system 14, in this example, the mortgage entity. This interaction can be processed through APIs linked to the remote system 14. The system server 24 transmits a query message 1805 which is routed through the network 16 and delivered to the remote system 14, which can respond by sending a response in the form of a result message 1810 which is routed through the Network 16 and delivered to the system server 24.

The process performed by the system server 24 includes identifying changes in the status of the user's loan with the mortgage entity. The user can automatically initiate this process at regular times, which can be determined by the application either statically or through the configuration area of the application. The system server 24 sends a recommendations message 1815, which informs the user that the mortgage ARM will end on a particular date and that the mortgage payment will be increasing. This message is sent to the controller 56 and routed to the client device 18/20/22 of the user through the network 16 and a recommendation 1820 may be received. Also, in the message may be data that serves to inform the user of possible actions that can be taken to assist in readying the user for the increase in payment or to avoid the loan altogether if the user desires. For example, the user may want to increase the monthly mortgage payment ahead of schedule or setup another loan plan.

In an alternate embodiment, the user has the option to connect with the banking entity to alter the mortgage payment. There is a component on the display of the client device 18/20/22, for example a button component, which when pressed, automatically connects to the banking entity where the user normally banks. This permits the user to setup a change of mortgage payments when the recommendations message 1815 is received. If necessary, a results message 1825 is sent from the client device 18/20/22 to the controller 56 and routed 1830 through the network 16 to the system server 24. This message serves to inform the system of any interactions of the user with the client device 18/20/22 to keep the system server 24 informed of any changes. The system server 24 may also update the remote system 14 to initiate changes that may have been received from the results message 1825/1830. This message, an update message 1835 is sent through the network 16 to the remote system server and may instruct the remote system to alter the monthly payment on the user's mortgage.

Figure 11:
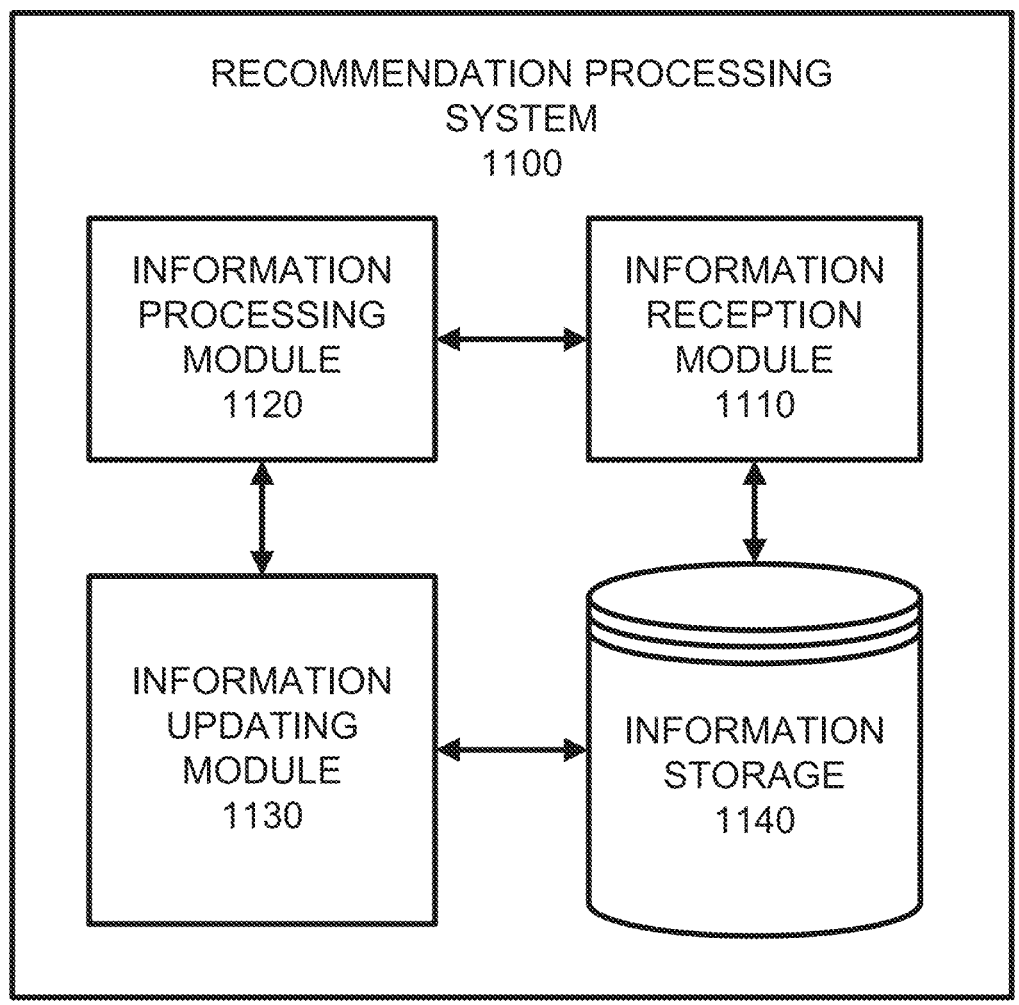
FIG. 11 illustrates a system configuration to perform one or more of the example embodiments of the present application.

FIG. 11 illustrates a notification or recommendation application system configuration configured to perform one or more of the example embodiments of the present application. Referring to FIG. 11, the system 1100 may be a module or device(s) that is configured to perform any of the above-noted operations. For instance, the system 1100 may include an information reception module 1110 that receives information as user data is accumulated based on identified queries, interests or other actions that cause information to be received and logged in accordance with a user account. The information processing module 1120 is responsible for retrieving the user information stored in memory 1140 and attempting to create user suggestions, notifications and perform subsequent processing operations based on the known user initiated operations. The information update module 1130 is responsible for storing in memory the user actions and changes to user information that may occur from known user actions, preferences and current interests.

The system configuration 1100 may perform a method of operation that includes identifying an active application programming interface (API) of a presently operating application executing on a user device and identifying input data populating at least one portion of the presently operating application.

The input data may then be stored and processed to identify a first topic of interest at an application server. The method may then include retrieving relevant content that is associated with the first topic of interest, and creating a recommendation message based on the relevant content.

The method may also include identifying an active application programming interface (API) of a presently operating application executing on a user device, identifying input data populating at least one portion of the presently operating application via an application server, retrieving at least one user characteristic, processing the input data based on the at least one user characteristic and creating a customized suggestion message that utilizes the at least one user characteristic to provide customized content in the customized suggestion message, and transmitting the customized suggestion message to the user device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 12 illustrates an example network element 1200, which may represent any of the above-described network components, etc.

Figure 12:
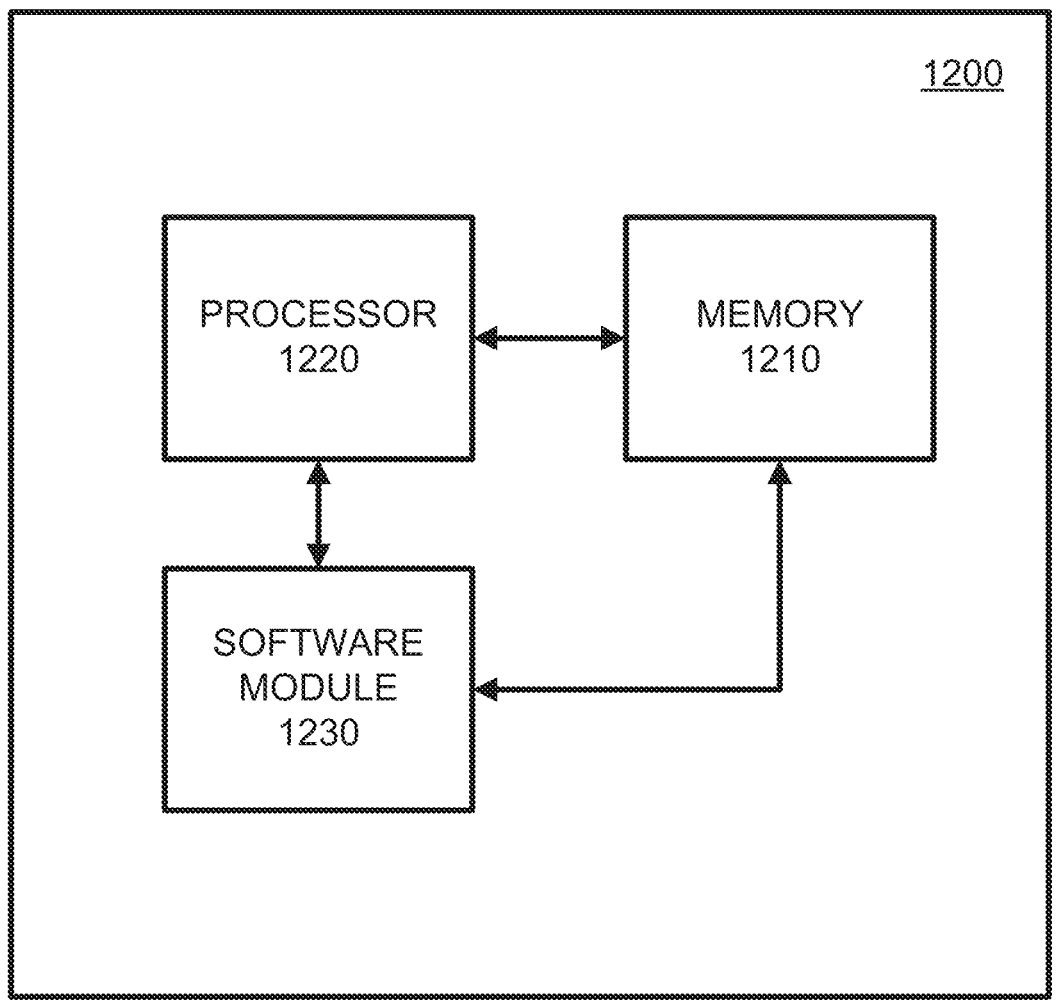
FIG. 12 illustrates an example network entity device configured to store instructions, software, and corresponding hardware for executing the same, according to example embodiments of the present application.

As illustrated in FIG. 12, a memory 1210 and a processor 1220 may be discrete components of the network entity 1200 that are used to execute an application or set of operations. The application may be coded in software in a computer language understood by the processor 1220, and stored in a computer readable medium, such as, the memory 1210. The computer readable medium may be a non-transitory computer readable medium that includes tangible hardware components in addition to software stored in memory. Furthermore, a software module 1230 may be another discrete entity that is part of the network entity 1200, and which contains software instructions that may be executed by the processor 1220. In addition to the above noted components of the network entity 1200, the network entity 1200 may also have a transmitter and receiver pair conFIG.d to receive and transmit communication signals (not shown).

Figure 8:
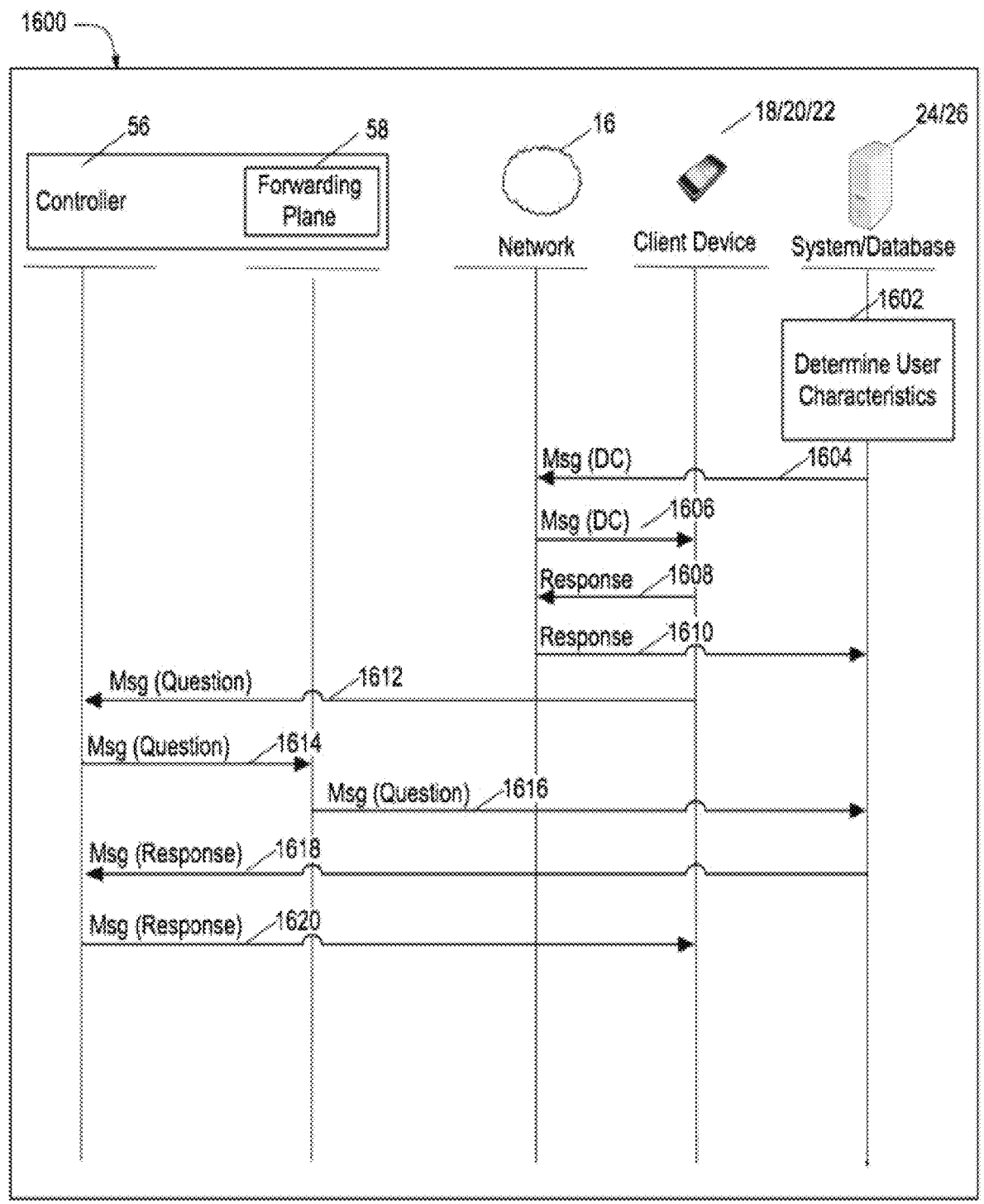
FIG. 8 illustrates a system signaling diagram according to example embodiments of the present application.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 8 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the FIG.s herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    identifying input data populating at least one portion of a presently operating application via an application server;
    retrieving at least one user characteristic;
    processing the input data based on the at least one user characteristic by identifying a category of information associated with the input data and a weight to apply to the at least one user characteristic, wherein the weight is based on at least one of a source of the input data and the category of information;
    creating a customized suggestion message that utilizes the at least one user characteristic and the applied weight to provide customized content in the customized suggestion message; and
    transmitting the customized suggestion message to the user device.

2. The method of claim 1, further comprising inserting a universal resource locator (URL) in the customized suggestion message.

3. The method of claim 1, further comprising:
    parsing the input data to identify terms of interest; and
    comparing the terms of interest to the at least one user characteristic.

4. The method of claim 3, further comprising:
    matching at least one term of interest to the at least one user characteristic; and
    querying a data source for content relevant to the matched at least one term of interest.

5. The method of claim 1, further comprising identifying an active application programming interface (API) of a presently operating application executing on a user device.

6. The method of claim 1, wherein the at least one user characteristic comprises at least one of information selected, information received, requested information, groups linked to a user account, email messages, calendar events, web browsing history, location, games accessed, and video content accessed.

7. The method of claim 1, further comprising:
    receiving an update message from the application server; and
    updating the at least one user characteristic based on at least one change identified in the update message.

8. An apparatus comprising:
    a processor configured to
    identify input data populating at least one portion of a presently operating application via an application server;
    retrieve at least one user characteristic;
    process the input data based on the at least one user characteristic by identification of a category of information associated with the input data and a weight to apply to the at least one user characteristic, wherein the weight is based on at least one of a source of the input data and the category of information;
    create a customized suggestion message that utilizes the at least one user characteristic and the applied weight to provide customized content in the customized suggestion message; and
    a transmitter configured to transmit the customized suggestion message to the user device.

9. The apparatus of claim 8, wherein the processor is further configured to insert a universal resource locator (URL) in the customized suggestion message.

10. The apparatus of claim 8, wherein the processor is further configured to
    parse the input data to identify terms of interest; and
    compare the terms of interest to the at least one user characteristic.

11. The apparatus of claim 10, wherein the processor is further configured to
    match at least one term of interest to the at least one user characteristic; and
    query a data source for content relevant to the matched at least one term of interest.

12. The apparatus of claim 8, wherein the processor is further configured to identify an active application programming interface (API) of a presently operating application executing on a user device.

13. The apparatus of claim 8, wherein the at least one user characteristic comprises at least one of information selected, information received, requested information, groups linked to a user account, email messages, calendar events, web browsing history, location, games accessed, and video content accessed.

14. The apparatus of claim 8, further comprising:
    a receiver configured to receive an update message from the application server, and wherein the processor is further configured to update the at least one user characteristic based on at least one change identified in the update message.

15. A non-transitory computer readable storage medium configured to store instructions that when executed cause a processor to perform:
    identifying input data populating at least one portion of a presently operating application via an application server;
    retrieving at least one user characteristic;
    processing the input data based on the at least one user characteristic by identifying a category of information associated with the input data and a weight to apply to the at least one user characteristic, wherein the weight is based on at least one of a source of the input data and the category of information;

creating a customized suggestion message that utilizes the at least one user characteristic and the applied weight to provide customized content in the customized suggestion message; and transmitting the customized suggestion message to the user device.

16. The non-transitory computer readable storage medium of claim 15, wherein the processor is further configured to perform:

inserting a universal resource locator (URL) in the customized suggestion message.

17. The non-transitory computer readable storage medium of claim 15, wherein the processor is further configured to perform:

parsing the input data to identify terms of interest; and comparing the terms of interest to the at least one user characteristic.

18. The non-transitory computer readable storage medium of claim 17, wherein the processor is further configured to perform:

matching at least one term of interest to the at least one user characteristic; and querying a data source for content relevant to the matched at least one term of interest.

19. The non-transitory computer readable storage medium of claim 15, wherein the processor is further configured to perform identifying an active application programming interface (API) of a presently operating application executing on a user device.

20. The non-transitory computer readable storage medium of claim 15, wherein the at least one user characteristic comprises at least one of information selected, information received, requested information, groups linked to a user account, email messages, calendar events, web browsing history, location, games accessed, and video content accessed, and wherein the processor is further configured to perform receiving an update message from the application server, and updating the at least one user characteristic based on at least one change identified in the update message.

* * * * *